United States Patent [19]
Brauner

[11] Patent Number: 6,024,911
[45] Date of Patent: Feb. 15, 2000

[54] METHOD OF PRODUCING A MOLDED ARTICLE HAVING A HOLLOW RIM

[75] Inventor: Manfred Brauner, Vienna, Austria

[73] Assignee: Perstorp AB, Perstorp, Sweden

[21] Appl. No.: 09/019,129

[22] Filed: Feb. 5, 1998

Related U.S. Application Data

[63] Continuation-in-part of application No. 08/682,533, filed as application No. PCT/SE95/00052, Jan. 20, 1995, abandoned.

[30] Foreign Application Priority Data

Jan. 28, 1994 [SE] Sweden .................... 9400267

[51] Int. Cl.⁷ .................................... B29C 45/00
[52] U.S. Cl. ............................. 264/572; 425/130
[58] Field of Search .................. 264/572; 425/130

[56] References Cited

U.S. PATENT DOCUMENTS

| 4,101,617 | 7/1978 | Friederich | 264/572 |
|---|---|---|---|
| 5,069,859 | 12/1991 | Loren | 264/572 |
| 5,127,814 | 7/1992 | Johnson et al. | 264/572 |
| 5,252,287 | 10/1993 | Fries . | |
| 5,262,105 | 11/1993 | Komiyama et al. . | |
| 5,584,470 | 12/1996 | Klotz | 264/572 |
| 5,869,105 | 2/1999 | Murphy et al. | 264/572 |

FOREIGN PATENT DOCUMENTS

| 440020 | 8/1991 | European Pat. Off. | 264/572 |
|---|---|---|---|
| 0 472 788 | 3/1992 | European Pat. Off. . | |
| 0 498 444 | 8/1992 | European Pat. Off. . | |
| 39 40 186 | 6/1991 | Germany . | |
| 41 28 883 | 3/1993 | Germany . | |
| WO 90/00466 | 1/1990 | WIPO . | |

OTHER PUBLICATIONS 9.1 Hohlkorper–Spritzub mit verandeerbarem Formnestvolumen, Spritzgiebtechisches Kolloquium, 1990.

Primary Examiner—Catherine Timm
Attorney, Agent, or Firm—Scully, Scott, Murphy & Presser

[57] ABSTRACT

A method of producing an injection molded article, such as a pallet made of a polymeric material. The pallet having an integral rim. Said rim is manufactured by means of a gas injection procedure involving a mold and means for injecting a pressurized gas into a molten polymeric material in the mold. The injection of the pressurized gas results in at least one substantially closed circumambient hollow internal channel in the rim, wherein the mold is provided with one or more mold cavity portions with an enlarged or expandable cross-section providing the outer shape of at least parts of the rim. The mold is further provided with at least one gate for injection of a molten polymeric material, and at least one gas duct for injection of the pressurized gas into the core of the molten polymeric material. Each gas duct is connected to a reservoir cavity, which reservoir cavities collectively form a part of the mold cavity portions. The reservoir cavities constitute a material reservoir for the molten polymeric material, as well as a leveling chamber for the gas stream inside the channel during the injection of the pressurized gas. The gas pressure forces an excess of molten polymeric material into a means for expansion. The excess molten polymeric material is thereby leveled to the rim connected bulge, thereby forming an integrated part of the injection molded article.

8 Claims, 3 Drawing Sheets

METHOD OF PRODUCING A MOLDED ARTICLE HAVING A HOLLOW RIM

CROSS-REFERENCE TO RELATED APPLICATION

This is a continuation-in-part of application, Ser. No. 08/682,533, filed Jul. 25, 1996 now abandoned, which is a 371 of PCT/SE95/00052, filed Jan. 20, 1995.

BACKGROUND OF THE INVENTION

1. Field of the Invention

This present invention relates to an improved method of producing an injection molded article having a hollow blown rim being an integrated part of the article.

2. Discussion of the Prior Art

Injection molded container, crates, pallets and the like have most often one or more upper or outer rims whereby the rim provides strength and stability, as well being a stacking or gripping means. A commonly used concept for a rim consists of at least one U-shaped and downward open profile being circumambient or located on at least two opposite sides of a container, etc. In order to obtain satisfactory strength, rims of this type require reinforcing and other structural means, such as ribs, girders, webs, edgings, rippings and the like, which means are placed inside the rim or connecting the rim with a side wall of a container, a loading area of a pallet, etc. The manufacture of injection molded articles has such a rim concept and, furthermore, incurs a complex design of the mold cavities which are included in the mold, an excessive material usage and an increased cycle time. This results in an unnecessarily high product weight and in unnecessarily high costs. Open rims also cause and affect the accumulation of various contaminants, which is a major problem, especially in food processing and food transporting.

This problem can, however, be remedied by injecting, for example, a gas through separate inlets or together with the molten polymeric material. It is possible to thereby decrease the weight of the part and to make the ribs and profiles thicker, as seen from the outside. It is also known according to the state of the art that a closed hollow profile is stronger than an open profile, as seen, for example, in a traditional rib with the same amount of material used. Thus, the number of ribs and profiles can be reduced such that the product will become easier to clean.

One disadvantage of gas channels achieved through injection of a gas together with polymeric material is that the thickness of the material in the part is very difficult to guide. This is due to the fact that the polymeric material is very soft in a molten or semi-molten state. This might even cause a so-called blowout, wherein the gas cavity within the polymeric material ruptures the bubble of molten polymeric material. This occurs because the gas pressure is higher than the molding pressure. Gas injection pressures of up to 10 MPa are not unusual. Since the gas is normally injected through very narrow nozzles, the injection of the gas easily causes ruptures and uneven material thickness caused by turbulence in the hollow profiles. When a rupture occurs, the article will have to be rejected, and uneven material thickness will cause unreliability in the quality of the product, since wear could open thinner wall parts of the closed hollow profile. It is also known according to the state of the prior art that the undesirable thinner wall parts of the profile act as an indication of fracture, which randomly affects the mechanical strength of the product.

Hollow profiles can be produced using a number of well-known gas injection procedures which have been disclosed in detail. Some of the most important and commonly used procedures and companies or origin, include: The Battenfeld AIRMOLD, the Klöckner Ferromatik AIRPRESS, the Pearlesss Cinpress "Controlled Internal Pressure Moulding" (CINPRES), Encore Systems' "Engineered Nitrogen Coresystem" (ENCORE), Detroit Plastic Molding's "Gas-assisted Injection Molding" (GAIN), Engel's GASMELT, Dynamit-Nobel's "Gasinnendruckvergahren" (GID), Demag's "Gasinnendruckprozeβ" (GIP)and Schade's "Gasinjektiontechnik" (GIT).

A common feature of gas injection procedures encompass a mold cavity of a mold filled with a molten polymeric material followed by injection of a pressurized gas. Parts of the molten polymeric material are thereby displaced by the gas due to the discharge of excess of material or the expansion of the mold cavity, which results in a hollow, substantially closed molded article or a part of such an article. The pressurized gas is normally injected into the core of the molten polymeric material.

Gas injection procedures are used in conjunction with the injection molding of containers, crates, pallets and the like, as well as in the manufacture of e.g., pallet skids, various gripping and reinforcing means and partial rims, etc. International Publication No. WO 90/00466 discloses a method which allows articles of relatively large dimensions to be produced using a gas injection procedure. The method comprises a mold provided with a spill cavity. A charge of pressurized gas is injected into the mold cavity to displace a portion of the molten material. Displaced material flows through a passage into a connected spill cavity or reservoir alternatively serving as an appendage of the article, a separate article or a cavity to receive spilled material for regrinding. Such cavities necessitate a certain amount of subsequent treatment, such as removal of separate articles, spill material and strings, bar and the like connecting the finished, molded article with the material or article in a spill cavity.

SUMMARY OF THE INVENTION

It is, therefore, an object of the invention to provide an article produced by using said improved method.

There is certain, increasing need for containers, crates and pallets, etc., which have a design providing a high degree of mechanical strength, a low weight and a hygienic design, excluding the traditional reinforcing means discussed above. Hollow blown profiles produced by using a gas injection procedure can, to a certain extent, overcome or reduce the problems discussed above.

The present invention provides a method of producing an injection molded article having a circumambient, substantially closed hollow rim. The article is a storage, a transport or a waste container, a pallet, a pallet container or the like, made of a polymeric material. A rim is an integrated part of the article, which rim is manufactured by means of a gas injection procedure involving a mold and means for injecting a pressurized gas into a molten polymeric material in the mold. The injection of the pressurized gas results in at least one substantially closed, circumambient hollow internal channel in the rim. A mold cavity of the mold is provided with one or more mold cavity portions with an enlarged or expandable cross-section giving the outer shape of at least parts of the rim. The mold is further provided with at least one gate for injection of a molten polymeric material and at least one gas duct for the injection of the pressurized gas into the core of the molten polymeric material. Each gas duct is connected to each one reservoir cavity, which reservoir cavity form a part of the mold cavity portions. The reservoir cavity constitutes a material reservoir for the molten polymeric material, as well as a leveling chamber for the gas stream inside the channel during the injection of the pressurized gas. The gas pressure forces an excess of molten polymeric material into an expansion means, wherein the expansion means is selected from the group consisting of: (a) at least one gate for discharge of excess molten polymeric material into a spill cavity; (b) at least one moving part for controlled expansion of at least the reservoir cavities, and preferably, also the mold cavity portions to a pre-determined volume; and (c) or a combination of (a) and (b). The excess molten polymeric material is thereby leveled, and added to the rim connected bulge, thereby forming an integrated part of the injection molded article.

The reservoir cavities constitute a material reservoir for the polymeric material. The reservoir cavities will also counteract the negative effects caused by the flow of pressurized gas into the molten polymeric material. These negative effects will normally consist, for example, of so-called blow-outs wherein the gas finds its ways through the polymeric material and a gas channel is formed between an inner wall of the mold cavity and the polymeric material. Another example of a negative effect is turbulence in the gas flow, which causes uneven material thickness in the channel-like profile. These disparities in material thickness are randomly placed along the profile, and holes in the thinner parts of the profile wall might occur after some period of normal wear. These thinner parts of the profile wall also decrease the mechanical strength of the article inasmuch as they act as an indication of fracture. Since these disparities in material thickness are randomly placed along the profile, thus far, it has been impossible to design an article including such a profile for a certain predetermined mechanical strength.

The reservoir cavities produce a bulge in the rim. Such a bulge further increases the strength of the article and can be designed to work as a stacking, piling or guiding means, a stopper, gripper, lid attachment or the like.

The rim is produced by using a gas injection procedure. This provides a rim which provides adequate strength without reinforcing means, as well as a substantially uniform surface structure. Problems and drawbacks, as disclosed above, due to obstructions related to injection of the gas in a relatively large volume and length of a circumambient rim are overcome.

The article is preferably manufactured in one piece, and the rim is produced using a gas injection procedure. The article is preferably a transport or a storage container, a bottle crate, a waste container, a pallet or a pallet container and is made of a polymeric material, such as, for example, a thermoplastic material such as polyethylene and polypropylene.

BRIEF DESCRIPTION OF THE DRAWINGS

These and other features, aspects, and advantages of the apparatus and methods of the present invention will become better understood with regard to the following description, appended claims, and accompanying drawings wherein:

DETAILED DESCRIPTION OF THE PREFERRED EMBODIMENTS OF THE INVENTION

According to one embodiment of the invention, the molten polymeric material is injected so that it completely fills the mold cavity, including the mold cavity portions and the reservoir cavities. The molten polymeric material is allowed to solidify somewhat closest to the surface of the mold cavity. The gas is thereafter injected into the still molten polymeric material in the center of the reservoir cavities, while the regulating means moves the moving part so that the volume of the mold cavity portions and/or the reservoir cavities increases. A hollow space will thereby form within the polymeric material. The regulating means consist of hydraulic or pneumatic cylinders, stepping motors or the like. These are normally guided by means of the processor of the molding machine. It is, however, possible to use the gas which is used for forming the hollow space. When it is allowed to flow into the molten polymeric material, the gas will also flow into the regulating means consisting of a pneumatic cylinder via a flow restricting valve. This valve is used for regulating the velocity of the moving part.

According to another embodiment of the invention, the molten polymeric material is injected so that it completely fills the mold cavity including the mold cavity portions and the reservoir cavities. The molten polymeric material is allowed to solidify somewhat closest to the surface of the mold cavity. The gas is thereafter injected into the still molten polymeric material in the center of the reservoir cavities, wherein the excess polymeric material is discharged into a spill cavity. A hollow space will thus form within the polymeric material. Any aperture in the circumambient rim resulting from the gas duct or a gate for injection or discharge of molten polymeric material is preferably sealed. The sealing is suitably performed by applying a molten polymeric material or performed by means of a loosely attached glued or ultrasonically welded plug, plate or the like.

A further aspect of the present invention refers to a molded article produced by using the method disclosed above. The article is preferably selected from the group consisting of transport or storage containers, bottle crates, waste containers, pallets, pallet containers or similar storage or transport appliances.

Figure 1:
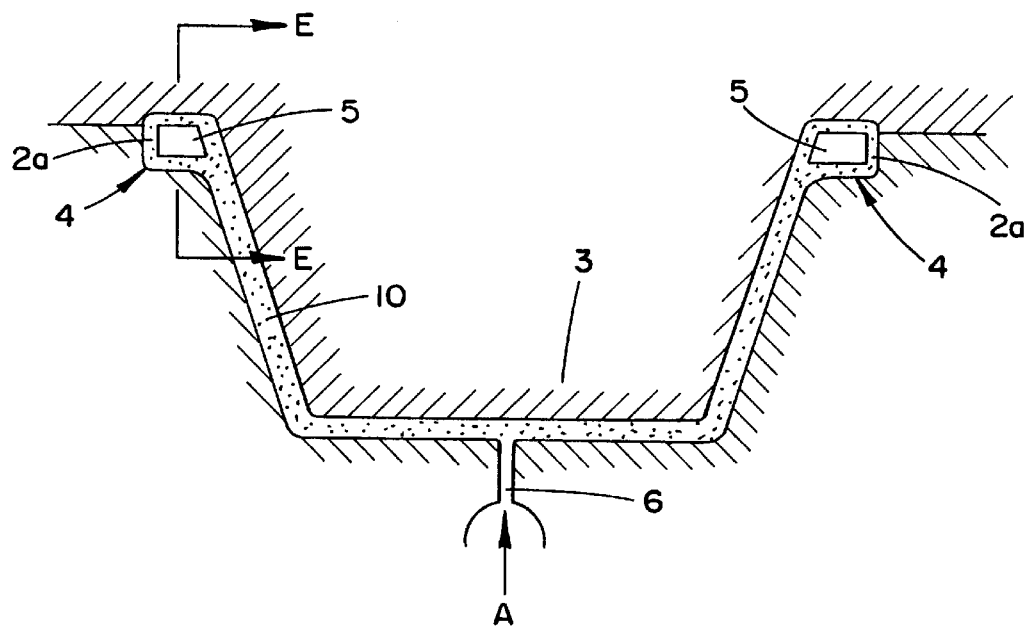
FIG. 1 illustrates a sectional view of the mold of the present invention.

FIG. 1 is a schematic cross-section of a mold 3 wherein a container is produced. This view was selected in order to facilitate better understanding of drawing FIGS. 2–5.

Figure 6:
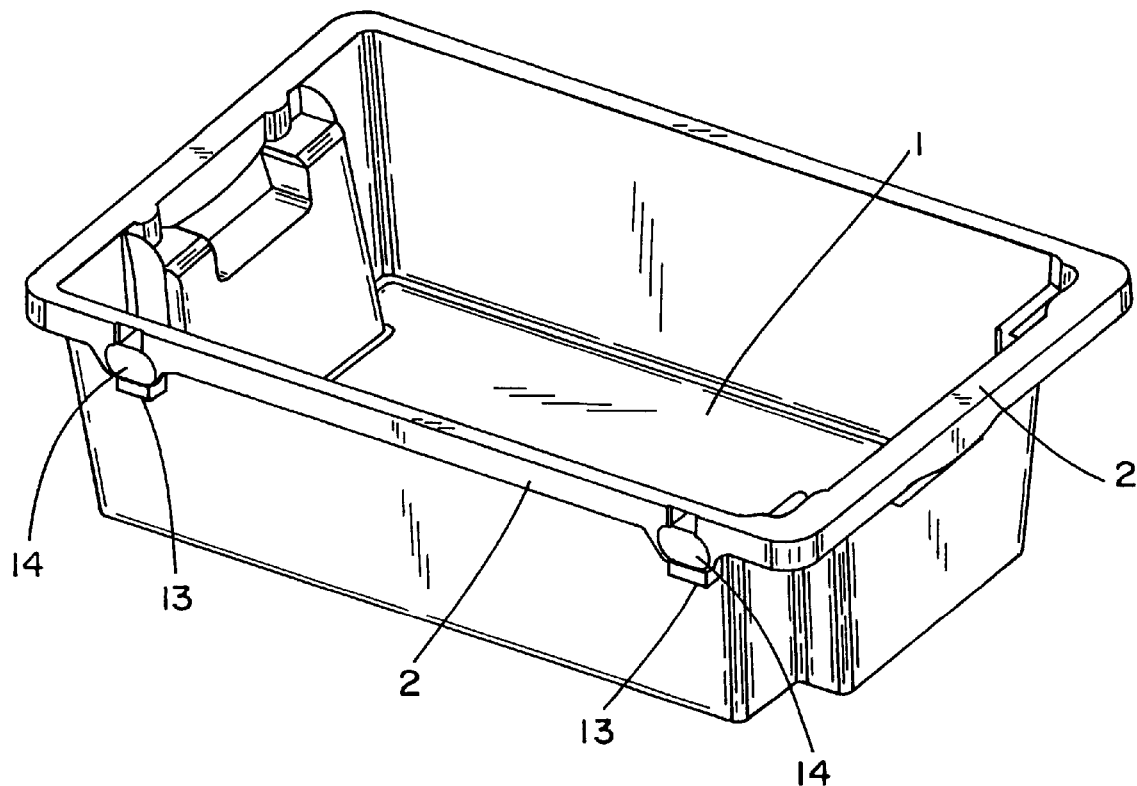
FIG. 6 illustrates an injection moulded article having a circumambient rim and being an integrated part of the article.
Figure 7:
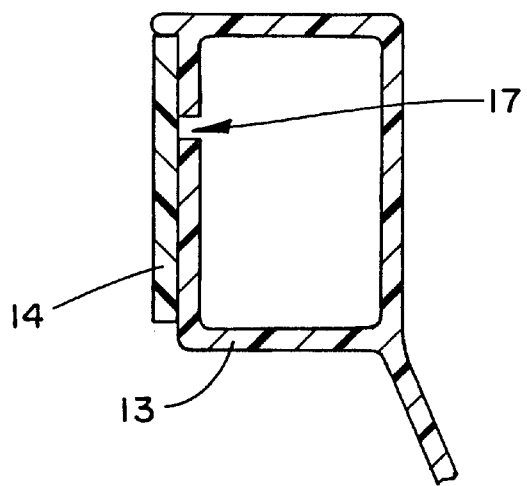
FIG. 7 is a cross-sectional view of the part of the article wherein the gas is introduced and a plug for sealing the hole resulting therefrom.

FIGS. 2–5 are schematic cross-sections of mold cavity portion 4 referred to as section E—E in FIG. 1. Mold cavity portion 4 is equipped for a gas injection procedure. Mold cavity portion 4 is part of mold 3 used in various embodiments of the invention and is shown before and after gas injection. FIG. 6 is an injection molded article 1 having a circumambient rim as an integrated part thereof. Article 1, as shown in FIG. 6, is a transport and storage container. FIG. 7 shows, in cross-section, an aperture 17 in a bulge 13 resulting from the process according to the invention.

Referring now in more detail to FIG. 1, there is illustrated a schematic cross-section of a mold 3. Mold 3 comprises a mold cavity giving shape to the article. The mold cavity includes a mold cavity portion 4, which gives the shape of a substantially closed hollow, circumambient rim 2 (see FIG. 6) comprising a wall 2a and being an integrated part of the injection molded article. Mold 3 includes a gate 6 for the injection of molten polymeric material 10. Molten polymeric material 10 is injected through gate 6, as indicated by arrow A. A hollow channel 5 is formed in the rim.

Figure 2:
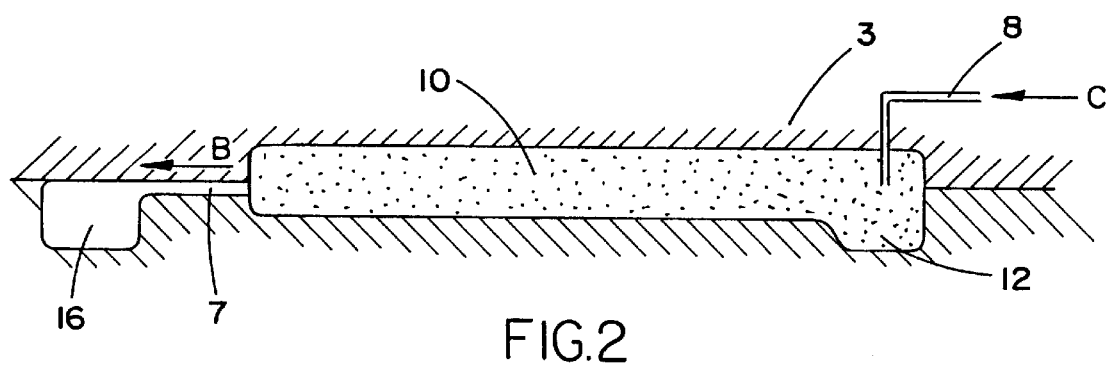
FIG. 2 illustrates a sectional view of the mold cavity portion of the mold after filling with molten polymeric material but before gas injection through the duct as taken along line E—E in FIG. 1.
Figure 3:
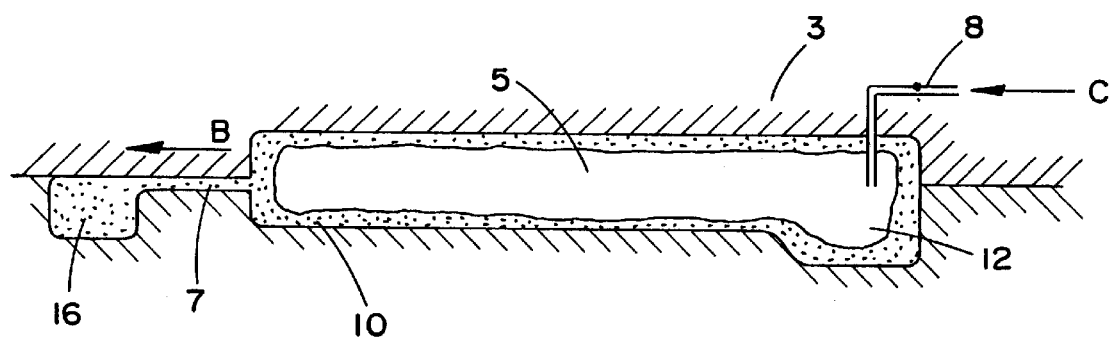
FIG. 3 illustrates the sectional view of the mold cavity portion of the mold of FIG. 2 after gas injection through the duct.

FIGS. 2 and 3 show schematic cross-section E—E of a part of mold 3 from FIG. 1 with a mold cavity giving shape to an injection molded article. The mold cavity includes a mold cavity portion 4 having a gate 7 for the discharge of excess polymeric material 10 into a spill cavity 16, which mold cavity portion 4 gives the shape of a substantially closed hollow, circumambient rim 2 (see FIG. 6) comprising a wall 2a (see FIG. 1) and being an integrated part of the injection molded article. Only a part of said rim 2 is, for reasons of simplicity, shown and from a long side. The mold 3 includes a gate 6 (see FIG. 1) for the injection of molten polymeric material 10, a duct 8 for the injection of gas into the core of the molten polymeric material 10, a reservoir cavity 12 coupled to and surrounding duct 8 and, further, a gate 7 for the discharge of excess molten polymeric material 10 into a spill cavity 16. FIG. 2 shows the mold cavity portion 4 after filling with molten polymeric material 10, but before gas injection through duct 8. FIG. 3 shows the same mold cavity portion 4 as FIGS. 1 and 2, but after the gas injection through duct 8, whereby excess molten polymeric material is discharged through gate 7 into spill cavity 16, and a hollow channel 5 is formed within molten polymeric material 10 and, thus, within rim 2 (see FIGS. 1 and 6). Reservoir cavity 12 works as a material reservoir, as well as a leveling chamber for the gas stream during injection of the gas. Molten polymeric material 10 is injected through gate 6 (see FIG. 1), as indicated by arrow A (see FIG. 1), and discharged through gate 7 into spill cavity 16, as indicated by arrow B. Gas is injected through duct 8, as indicated by arrow C.

Figure 4:
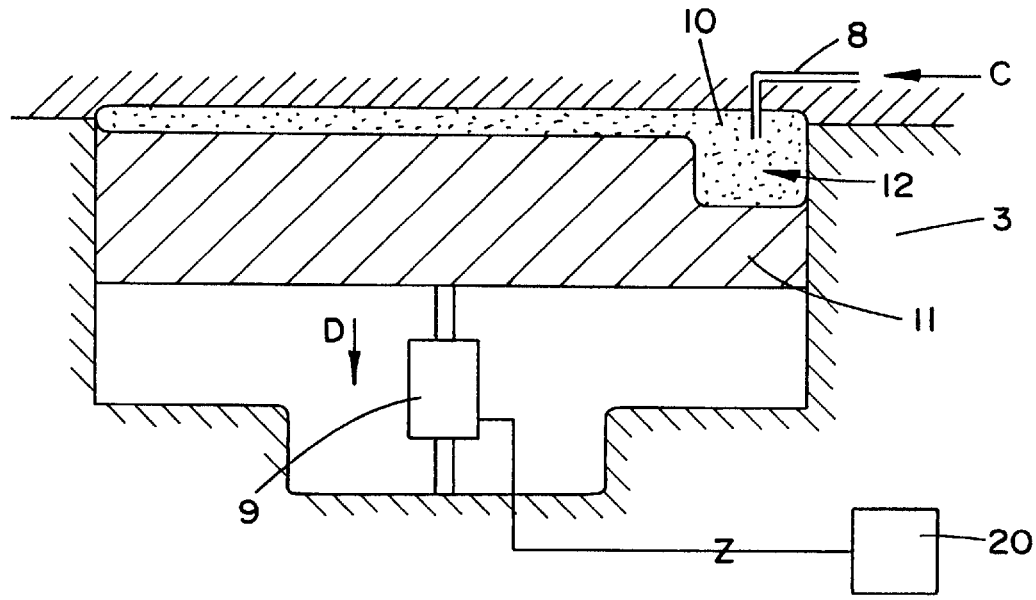
FIG. 4 illustrates a sectional view of the mold cavity portion as it would appear if taken along line E—E in FIG. 1 showing an alternative embodiment of the mold having a moving part and after filling with molten polymeric material but before gas injection through the duct.
Figure 5:
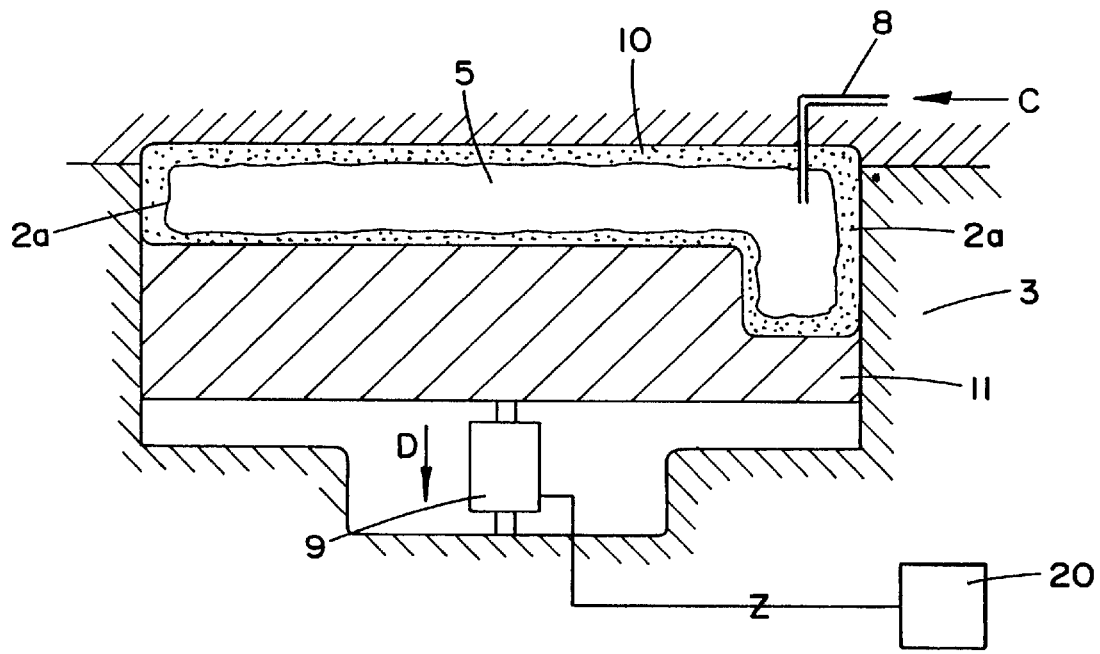
FIG. 5 illustrates the mold cavity portion of FIG. 4 after injection of gas through the duct.

FIGS. 4 and 5 show in schematic cross-section, from a direction comparable to cross-section E—E of FIG. 1, a part of a mold 3 comprising a mold cavity portion 4, having a moving part 11 for the controlled expansion of the mold cavity. The mold cavity portion 4 gives shape to a substantially closed, hollow circumambient rim 2 (see FIG. 6) comprising a wall 2a. Only a part of said rim 2 is, for reasons of simplicity, shown and from a short side. Mold 3 includes a gate 6 (see FIG. 1) for the injection of molten polymeric material 10, a duct 8 for the injection of gas into the core of molten polymeric material 10, a reservoir cavity 12 coupled to and surrounding duct 8 and said moving part 11, which is provided with a regulating means 9. The moving part 11 is moved by a regulating means 9. Regulating means 9 consists of a hydraulic cylinder guided by a control means 20 consisting of a processor of a molding machine (not shown) in which mold 3 has been applied.

FIG. 4 shows mold cavity portion 4 after filling with molten polymeric material 10, but before the injection of gas through duct 8. FIG. 5 shows the same mold cavity portion 4 as FIG. 4, but after the injection of gas through duct 8, whereby mold cavity portion 4 is expanded, as is the area of wall 2a (as seen from the outside), when moving part 11 moves, as indicated by arrow D, and hollow channel 5 is formed within molten polymeric material 10 and, thus, within rim 2 (see FIGS. 1 and 6). Reservoir cavity 12 works as a material reservoir, as well as a leveling chamber for the gas stream during the injection of the gas. This gas stream might otherwise cause rupture in not yet fully solidified polymeric material 10. Molten polymeric material 10 is injected through gate 6 (see FIG. 1), as indicated by arrow A (see FIG. 1), and gas is injected through duct 8, as indicated by arrow C.

In a preferred embodiment of the invention, reservoir cavities 12 are the only parts of mold 3 through which volume expansion of the mold cavity is achieved. Volume expansion of these reservoir cavities 12 thereby provides a volume of hollow space within hollow channel 5. Parts of polymeric material 10, which is initially placed in mold cavity portion 4, which mold cavity portion 4 gives shape to the main part of circumambient rim 2, is displaced into expanding reservoir cavities 12. Reservoir cavities 12 give shape to a bulge 13 (see FIG. 6) in the article. Reservoir cavities 12 are suitably designed to work together in groups of two or more, wherein gas is injected into a first reservoir cavity 12, and a second reservoir cavity 12 is intended to receive the major part of the surplus polymeric material from mold cavity portion 4.

The molten polymeric material 10 is thereby injected through gate 6. The material is then allowed to solidify somewhat closest to the walls of the mold cavity of mold 3. The gas is then injected through duct 8 into said first reservoir cavity 12. The pressure caused by the gas inside mold cavity portion 4 is allowed to rise before movement of moving parts 11 is initiated. This movement causes expansion of said mold cavity portion 4. The movement of said moving parts 11 is controlled by regulating means 9 consisting of hydraulic cylinders. The waiting time before the initiation of volume expansion of mold cavity portions 4, as well as the velocity of volume expansion, is guided by control means 20 consisting of the processor of the molding machine (not shown) controlling the hydraulic cylinders. It is also possible to balance the pressure inside the hydraulic cylinder caused by the hydraulic fluid used for operating said hydraulic cylinder to the maximum gas pressure used in the process. Thus, the gas pressure will move moving parts 11 when the required pressure is reached.

FIG. 6 shows, in a perspective view seen from above injection molded article 1, a transport and storage container having a substantially closed, hollow circumambient upper rim 2. The article is produced using the method according to the present invention, and said hollow rim 2 is an integrated part of article 1. Rim 2 has bulges 13 resulting from reservoir cavities 12 (see FIGS. 2–5) in mold cavity portions 4 (see FIGS. 1-5). Apertures 17 (see FIG. 7) in said bulges 13 resulting from gas duct 8 (see FIGS. 2-5) are sealed by ultrasonically welded plates 14 (see FIG. 7). Bulges 13 and, hence, reservoir cavities 12 and gas ducts 8 (see FIGS. 2–5) are placed in pairs on the long sides of rim 2 and of said mold cavity portions 4 (see FIGS. 2–5), respectively.

FIG. 7 shows in cross-section said bulges 13 formed by said reservoir cavities 12 (see FIGS. 2–5). Said apertures 17 in said bulges 13 result from said gas duct 8 (see FIGS. 2–5) and are sealed by ultrasonically welded plates 14.

While there have been shown and described what are considered to be preferred embodiments of the invention and examples, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims

What is claimed is:

1. A method of producing an injection molded article in a mold, said molded article being made of a polymeric material and having an integral circumambient rim, said rim having a wall and a closed hollow internal channel, said mold comprising at least one mold cavity defining the shape of said molded article, said mold cavity having a rim forming mold cavity portion, the rim forming mold cavity portion further having at least one reservoir cavity of enlarged cross-section, said mold further having at least one injection gate in communication with said mold cavity, and at least one gas duct, there being one gas duct in communication with each of said reservoir cavities, said method comprising the steps of:

injecting said molten polymeric material into said mold cavity via said injection gate;

injecting pressurized gas into said molten polymeric material via said at least one gas duct;

expanding said rim forming mold cavity portion by way of an expansion means; and wherein said reservoir cavity is sized and shaped to serve as a leveling chamber for the gas during injection of the gas and a material reservoir for the polymeric material, whereby said pressurized gas forces an excess of said molten polymeric material from said reservoir cavity into other portions of said rim forming mold cavity being expanded by said expansion means, said pressurized gas forming said hollow internal channel and said excess molten polymeric material being evenly distributed about the rim thereby forming said wall, the polymeric material remaining in said reservoir cavity forming a bulge integral with said rim of said molded article.

2. The method of claim 1, wherein said reservoir cavity is expandable in volume.

3. The method of claim 1, wherein said expansion means further comprises at least one discharge gate and wherein said method further comprises the step of discharging excess molten polymeric material from said mold cavity into said discharge gate and into a spill cavity.

4. The method of claim 2, wherein said expansion means comprises at least one moving part and wherein said method further comprises the step of controlling expansion of said reservoir cavities and/or mold cavity portions.

5. The method of claim 1, wherein the mold further comprises:

regulating means for controlling the volume expansion of said reservoir cavities and/or said mold cavity portions; and control means for controlling the movement of said moving part via the regulating means.

6. The method of claim 5, wherein said control means is a first processor receiving electrical signals from a second processor of a molding machine in which the mold is applied.

7. The method of claim 5, wherein said control means is a processor of a molding machine in which the mold is applied.

8. The method of claim 5, wherein said regulating means is selected from a group consisting of a hydraulic cylinder, a pneumatic cylinder or a stepping motor.

* * * * *